United States Patent
Goto et al.

(10) Patent No.: US 8,185,125 B2
(45) Date of Patent: May 22, 2012

(54) TRANSMISSION RATE CONTROL METHOD, MOBILE COMMUNICATION SYSTEM AND RADIO BASE STATION

(75) Inventors: Yoshikazu Goto, Yokosuka (JP);
Akihito Hanaki, Yokohama (JP);
Takahiro Hayashi, Yokosuka (JP);
Junichiro Kawamoto, Tokyo (JP);
Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 709 days.

(21) Appl. No.: 12/254,984

(22) Filed: Oct. 21, 2008

(65) Prior Publication Data
US 2009/0104914 A1    Apr. 23, 2009

(30) Foreign Application Priority Data

Oct. 22, 2007  (JP) ................ P2007-274267

(51) Int. Cl.
*H04M 1/00*    (2006.01)

(52) U.S. Cl. .......... 455/452.1; 455/452.2; 455/450; 455/424; 455/561; 455/522; 370/327; 370/328; 370/329; 370/332

(58) Field of Classification Search ............ 455/452.1, 455/561, 522, 420, 525, 509, 450, 458; 370/328, 370/329, 331, 252, 327, 349, 332
See application file for complete search history.

(56) References Cited

U.S. PATENT DOCUMENTS

| | | | |
|---|---|---|---|
| 7,512,091 B2 * | 3/2009 | Seol et al. | 370/328 |
| 7,660,279 B2 * | 2/2010 | Brueck et al. | 370/328 |
| 7,734,255 B2 * | 6/2010 | Matsunaga | 455/63.1 |
| 7,801,547 B2 * | 9/2010 | Wang et al. | 455/522 |
| 2005/0054347 A1 * | 3/2005 | Kakani | 455/452.1 |
| 2008/0026741 A1 * | 1/2008 | Nakamata et al. | 455/420 |

FOREIGN PATENT DOCUMENTS

| | | |
|---|---|---|
| JP | 06-054018 A | 2/1994 |
| JP | 11-098142 A | 4/1999 |
| JP | 2004-537203 A | 12/2004 |
| WO | 2005/039229 A1 | 4/2005 |
| WO | WO 2006/123275 A1 | 11/2006 |

OTHER PUBLICATIONS

Universal Mobile Telecommunications System(UMTS); Enhanced uplink; Overall description; Stage 2(3GPP TS 25.319 version 7.2.0 Release 7); ETSI TS 125 319 Mar. 1, 2007 ETSI Standards,LIS, Sophila Antipolis Cedex, France, XP014037911.

* cited by examiner

*Primary Examiner* — Charles Appiah
*Assistant Examiner* — Michael Vu
(74) *Attorney, Agent, or Firm* — Marvin A. Motsenbocker; Mots Law, PLLC (57) ABSTRACT

A transmission rate control method according to the present invention includes: selecting, at the radio base station NodeB, increase-allowed mobile stations whose uplink user data transmission rate can be increased at a predetermined TTI; equally dividing, at the radio base station NodeB, an available radio resource at the predetermined TTI, based on the number of increase-allowed mobile stations or the number of E-AGCHs that can be transmitted in the cell; and adding, at the radio base station NodeB, the radio resource equally divided by a radio resource allocating unit 13A, to each radio resources allocated to each mobile stations to which a transmission rate control channel (E-AGCH) can be transmitted and is one of the increase-allowed mobile stations.

9 Claims, 5 Drawing Sheets

| PRIORITY CLASS | A | B | C |
|---|---|---|---|
| DEGREE OF PRIORITY | 8 | 4 | 1 |
| NUMBER OF UP-TARGET MOBILE STATIONS | 1 | 1 | 1 |
| RADIO RESOURCE ALLOCATION RATIO | $\dfrac{8}{8\times1+4\times1+1\times1}$ | $\dfrac{4}{8\times1+4\times1+1\times1}$ | $\dfrac{1}{8\times1+4\times1+1\times1}$ |

FIG. 7

| PRIORITY CLASS | A | B | C |
|---|---|---|---|
| DEGREE OF PRIORITY | 8 | 4 | 1 |
| NUMBER OF UP-TARGET MOBILE STATIONS | 2 | 0 | 1 |
| RADIO RESOURCE ALLOCATION RATIO | $\dfrac{8}{8\times2+1\times1}$ | — | $\dfrac{1}{8\times2+1\times1}$ |

FIG. 8

TRANSMISSION RATE CONTROL METHOD, MOBILE COMMUNICATION SYSTEM AND RADIO BASE STATION

CROSS REFERENCE TO RELATED APPLICATION

This application is based upon and claims the benefit of priority from prior Japanese Patent Application No. 2007-274267, filed on Oct. 22, 2007; the entire contents of which are incorporated herein by reference.

BACKGROUND OF THE INVENTION

1. Field of the Invention

The present invention relates to a transmission rate control method, a mobile communication system and a radio base station for controlling a transmission rate of uplink user data transmitted from a mobile station, based on an allowed value notified through a transmission rate control channel from a radio base station.

2. Description of the Related Art

In a conventional mobile communication system, when setting a dedicated channel, a radio network controller is configured to determine a transmission rate of uplink user data, in consideration of a radio resource of a radio base station, an amount of an interference in the uplink, a transmission power of a mobile station, a transmission processing performance of the mobile station, a transmission rate required for an upper application, and the like; and to notify the determined transmission rate of the uplink user data by a layer 3 (radio resource control layer) message to both of the mobile station and the radio base station.

Here, the radio network controller is provided at an upper level of the radio base station, and is an apparatus configured to control the radio base station and the mobile station.

In general, data communications often cause burst traffic compared with voice communications or TV communications. Therefore, it is preferable that a transmission rate of a channel used for the data communications is changed fast.

Figure 7:
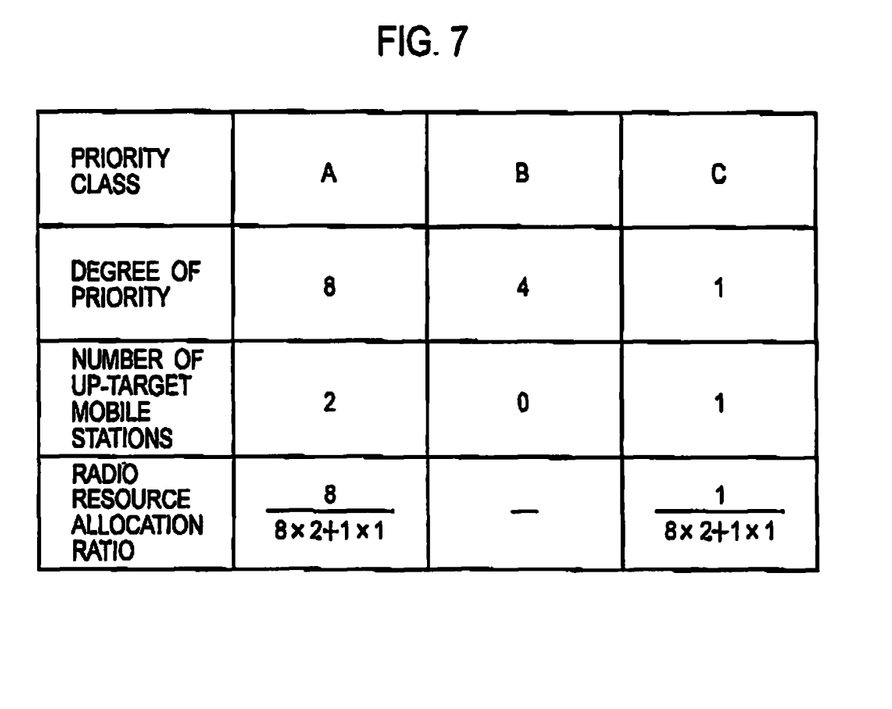
FIG. 7 is a diagram for describing the radio resource allocation method performed by the radio resource allocating unit of the radio base station according to the second embodiment of the present invention.

However, as shown in FIG. 7, a radio network controller integrally controls a plurality of radio base stations in general. Therefore, in the conventional mobile communication system, there has been a problem that it is difficult to perform fast control for changing of the transmission rate of uplink user data (for example, per approximately 1 through 100 ms), due to the increase of processing load and processing delay in the radio network controller RNC.

In addition, in the conventional mobile communication system, there has been also a problem that costs for implementing an apparatus and for operating a network are substantially increased even when the fast control for changing of the transmission rate of the uplink user data can be performed.

Figure 1:
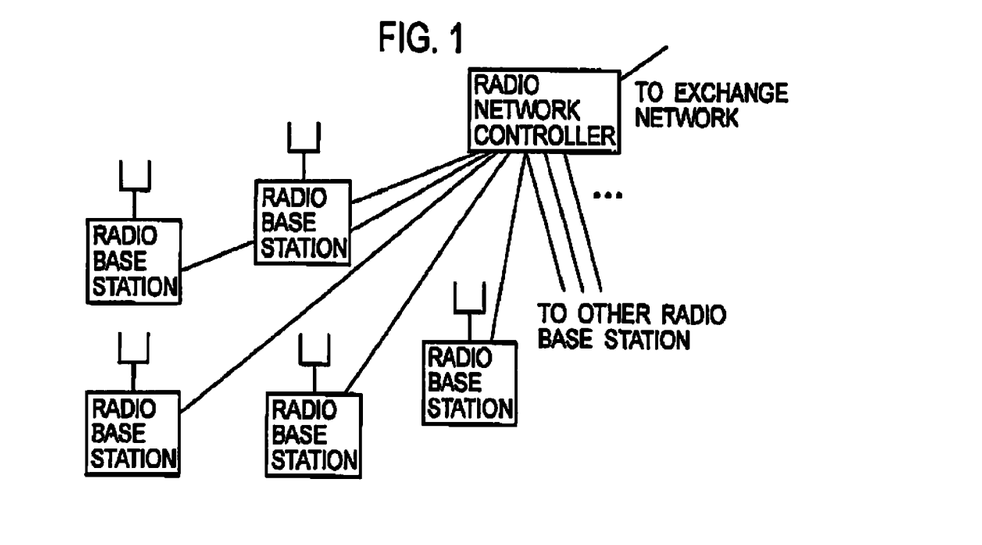
FIG. 1 is an overall configuration diagram of a general mobile communication system.
Figure 2A:
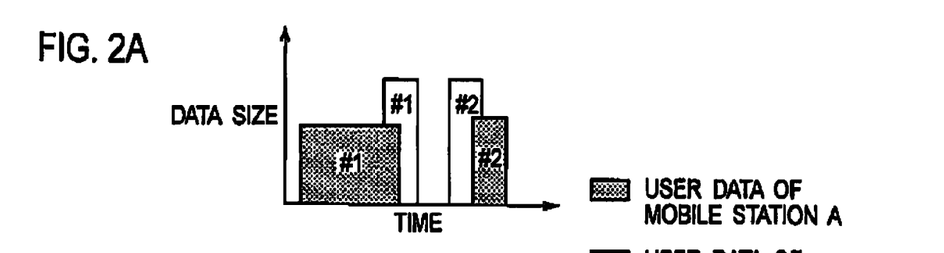
FIG. 2 is a diagram for describing an uplink transmission rate control method performed in a mobile communication system according to a conventional technique.
Figure 2B:
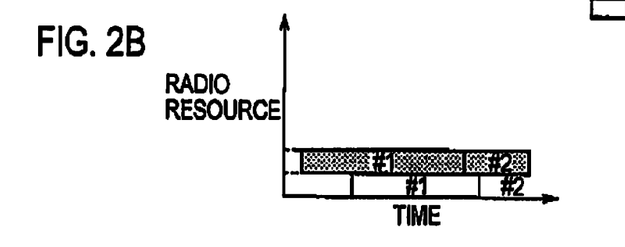
Figure 2C:
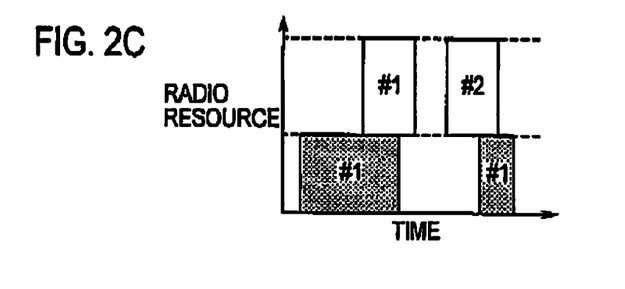

Accordingly, in the conventional mobile communication system, when burst data transmission is performed as shown in FIG. 2A, the data are transmitted by accepting low-speed, high-delay, and low-transmission efficiency as shown in FIG. 2B, or, as shown in FIG. 2C, by reserving radio resources for high-speed communications to accept the radio bandwidth resources in an unoccupied state and hardware resources in the radio base station Node B are wasted.

In each of FIGS. 2B and 2C, "radio resource" on the vertical axis refers to both of the radio band resource and the hardware resource mentioned above. Hereinafter, a radio band resource and a hardware resource are collectively referred to as a "radio resource".

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the uplink radio resources effectively. Such discussions or discussed functions will be hereinafter referred to as "Enhanced Uplink (EUL)".

Hereinbelow, an example will be given for a control method of a radio resource (i.e., a transmission rate of uplink user data) for transmitting the uplink user data, which has been discussed in the "enhanced uplink".

In the control method, a radio base station NodeB is configured to assign a radio resource to be used for transmitting the uplink user data to each of mobile stations UE at a predetermined timing (TTI: transmission time interval).

The radio base station NodeB is configured to notify, to each of the mobile stations UE by using an enhanced absolute grant channel (E-AGCH), an absolute grant (AG) corresponding to the radio resource to be assigned to each of the mobile stations UE.

The radio base station NodeB is also configured to notify, to each of the mobile stations UE, a relative grant (RG), which indicates changes (UP/DOWN/HOLD) in a transmission rate of the uplink user data corresponding to the radio resource assigned to each of the mobile stations UE. The radio base station NodeB transmits the RG by use of an enhanced-relative grant channel (E-RGCH).

A related technique is disclosed in International Patent Publication No. WO2005/039229.

However, in the above-described "enhanced uplink", specific method for assigning the radio resources for transmitting the uplink user data is not described, when a radio base station NodeB separately transmits the E-AGCHs and controls the transmission rates of the uplink user data for each of the mobile stations UE.

SUMMARY OF THE INVENTION

A first aspect of the present invention is summarized as a transmission rate control method in which a radio base station controls a transmission rate of uplink user data transmitted from a mobile station, including: selecting, at the radio base station, from among mobile stations performing communications in a cell, increase-allowed mobile stations whose uplink user data transmission rate can be increased at a predetermined timing; equally dividing, at the radio base station, an available radio resource at the predetermined timing, based on the number of increase-allowed mobile stations or the number of transmission rate control channels that can be transmitted in the cell; adding, at the radio base station, the radio resource equally divided by the radio base station, to each radio resources allocated to each mobile stations to which a transmission rate control channel can be transmitted and is one of the increase-allowed mobile stations; notifying, from the radio base station to each mobile stations to which the transmission rate control channel can be transmitted and is one of the increase-allowed mobile stations, an allowed value corresponding to a radio resource to which the radio resource equally divided by the radio base station has been added; and transmitting, from each mobile stations to which the transmission rate control channel can be transmitted and is one of the increase-allowed mobile stations, uplink user data at a transmission rate corresponding to the allowed value.

In the first aspect of the invention, in the equally dividing, the radio base station may divide the available radio resource at the predetermined timing based on the number of transmission rate control channels that can be transmitted in the cell or the number of increase-allowed mobile stations, whichever smaller.

A second aspect of the present invention is summarized as a transmission rate control method in which a radio base station controls a transmission rate of uplink user data transmitted from a mobile station, including: selecting, at the radio base station, from among mobile stations performing communications in a cell, increase-allowed mobile stations whose uplink user data transmission rate can be increased at a predetermined timing; allocating, at the radio base station, an available radio resource at the predetermined timing, based on a priority class of each of the increase-allowed mobile stations, and based on the number of increase-allowed mobile stations or the number of transmission rate control channels that can be transmitted in the cell; adding, at the radio base station, the radio resource allocated by the radio base station, to each radio resources allocated to each mobile stations to which a transmission rate control channel can be transmitted and is one of the increase-allowed mobile stations; notifying, from the radio base station to each mobile stations to which the transmission rate control channel can be transmitted and is one of the increase-allowed mobile stations, an allowed value corresponding to a radio resource to which the radio resource allocated by the radio base station has been added; and transmitting, from each mobile stations to which the transmission rate control channel can be transmitted and is one of the increase-allowed mobile stations, uplink user data at a transmission rate corresponding to the allowed value.

In the second aspect of the invention, in the allocating, the radio base station may allocate the available radio resource at the predetermined timing, based on the number of transmission rate control channels that can be transmitted in the cell or the number of increase-allowed mobile stations, whichever smaller, and based on the priority class of each of the increase-allowed mobile stations.

A third aspect of the present invention is summarized as a mobile communication system in which a radio base station is configured to control a transmission rate of uplink user data transmitted from a mobile station. In the third aspect, the radio base station selects, from among mobile stations performing communications in a cell, increase-allowed mobile stations whose uplink user data transmission rate can be increased at a predetermined timing. Further, the radio base station equally divides an available radio resource at the predetermined timing, based on the number of increase-allowed mobile stations or the number of transmission rate control channels that can be transmitted in the cell. Moreover, the radio base station adds the radio resource equally divided by the radio base station, to each radio resources allocated to each mobile stations to which a transmission rate control channel can be transmitted and is one of the increase-allowed mobile stations. Further, the radio base station notifies, to each mobile stations to which the transmission rate control channel can be transmitted and is one of the increase-allowed mobile stations, an allowed value corresponding to a radio resource to which the radio resource equally divided by the radio base station has been added. Each mobile stations to which the transmission rate control channel can be transmitted and is one of the increase-allowed mobile stations transmits uplink user data at a transmission rate corresponding to the allowed value.

In the third aspect, the radio base station may equally divide the available radio resource at the predetermined timing based on the number of transmission rate control channels that can be transmitted in the cell or the number of increase-allowed mobile stations, whichever smaller.

A fourth aspect of the present invention is summarized as a mobile communication system in which a radio base station is configured to control a transmission rate of uplink user data transmitted from a mobile station. In the fourth aspect, the radio base station selects, from among mobile stations performing communications in a cell, increase-allowed mobile stations whose uplink user data transmission rate can be increased at a predetermined timing. Further, the radio base station allocates an available radio resource at the predetermined timing, based on a priority class of each of the increase-allowed mobile stations, and based on the number of increase-allowed mobile stations or the number of transmission rate control channels that can be transmitted in the cell. Moreover, the radio base station notifies, to each mobile stations to which the transmission rate control channel can be transmitted and is one of the increase-allowed mobile stations, an allowed value corresponding to a radio resource to which the radio resource allocated by the radio base station has been added. Each mobile stations to which the transmission rate control channel can be transmitted and is one of the increase-allowed mobile stations transmits uplink user data at a transmission rate corresponding to the allowed value.

In the fourth aspect, the radio base station may allocate the available radio resource at the predetermined timing, based on the number of transmission rate control channels that can be transmitted in the cell or the number of increase-allowed mobile stations, whichever smaller, and based on the priority class of each of the increase-allowed mobile stations.

A fifth aspect of the present invention is summarized as a radio base station configured to notify an allowed value by use of a transmission rate control channel and to control a transmission rate of uplink user data transmitted from a mobile station, including: a selecting unit configured to select, from among mobile stations performing communications in a cell, increase-allowed mobile stations whose uplink user data transmission rate can be increased at a predetermined timing; a radio resource allocating unit configured to equally divide an available radio resource at the predetermined timing, based on the number of increase-allowed mobile stations or the number of transmission rate control channels that can be transmitted in the cell; a radio resource assigning unit configured to add the radio resource equally divided by the radio base station, to each radio resources allocated to each mobile stations to which a transmission rate control channel can be transmitted and is one of the increase-allowed mobile stations; and a transmission rate control channel transmitting unit configured to notify, to each mobile stations to which the transmission rate control channel can be transmitted and being one of the increase-allowed mobile stations, an allowed value corresponding to a radio resource to which the radio resource equally divided by the radio base station has been added.

In the fifth aspect of the invention, the radio resource allocating unit may be configured to equally divide the available radio resource at the predetermined timing based on the number of transmission rate control channels that can be transmitted in the cell or the number of increase-allowed mobile stations, whichever smaller.

A sixth aspect of the present invention is summarized as a radio base station configured to notify an allowed value by use of a transmission rate control channel and to control a transmission rate of uplink user data transmitted from a mobile station, including: a selecting unit configured to select, from among mobile stations performing communications in a cell, increase-allowed mobile stations whose uplink user data transmission rate can be increased at a predetermined timing; a radio resource allocating unit configured to allocate an available radio resource at the predetermined timing, based on a priority class of each of the increase-allowed mobile stations, and based on the number of increase-allowed mobile stations or the number of transmission rate control channels that can be transmitted in the cell; a radio resource assigning unit configured to add the radio resource allocated by the radio base station, to each radio resources allocated to each mobile stations to which a transmission rate control channel can be transmitted and is one of the increase-allowed mobile stations; and a transmission rate control channel transmitting unit configured to notify, to each mobile stations to which the transmission rate control channel can be transmitted and being one of the increase-allowed mobile stations, an allowed value corresponding to a radio resource to which the radio resource allocated by the radio base station has been added.

In the sixth aspect of the invention, the radio resource allocating unit may be configured to allocate the available radio resource at the predetermined timing, based on the number of transmission rate control channels that can be transmitted in the cell or the number of increase-allowed mobile stations, whichever smaller, and based on the priority class of each of the increase-allowed mobile stations.

DETAILED DESCRIPTION OF THE PREFERRED EMBODIMENTS (Configuration of a Mobile Communication System According to a First Embodiment of the Present Invention)

A description will be given of a configuration of a mobile communication system according to a first embodiment of the present invention with reference to FIGS. 3 and 4.

Figure 3:
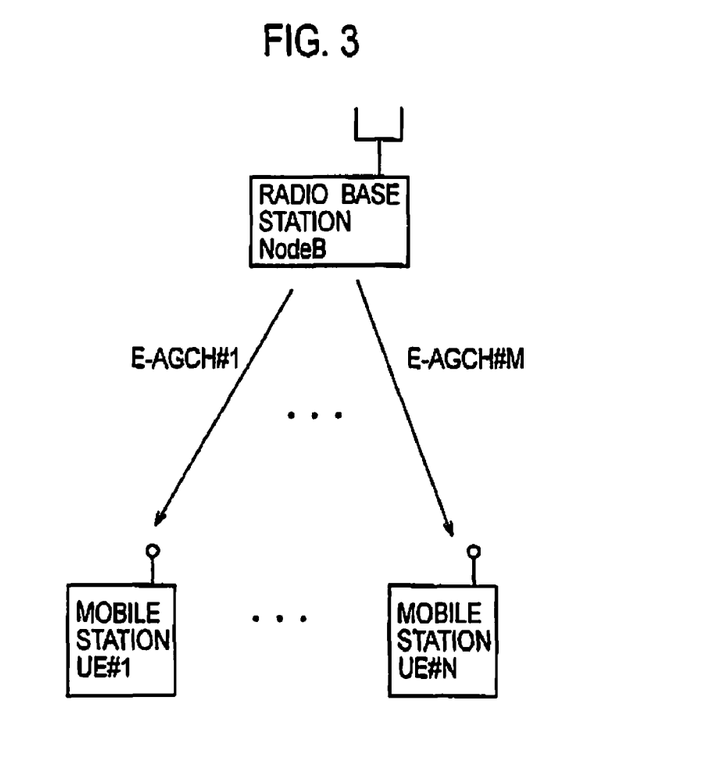
FIG. 3 is an overall configuration diagram of a mobile communication system according to a first embodiment of the present invention.

As shown in FIG. 3, in the mobile communication system of the present embodiment, a radio base station NodeB is configured to control transmission rates of uplink user data transmitted from a plurality of mobile stations UE#1 to #N. The radio base station NodeB controls the transmission rates by notifying AGs (allowed values) by using a plurality of E-AGCHs (transmission rate control channels) #1 to #M, to the mobile stations UE#1 to #N located in the same cell.

Note that, although a mobile communication system to which the "EUL" is applied is described in the present embodiment as an example, the present invention is not limited to this. Alternatively, the invention is applicable to any mobile communication system configured such that each of the transmission rates of uplink user data transmitted from a plurality of mobile stations is controlled by a notification of an allowed value transmitted through a transmission rate control channel.

To be more specific, in "EUL", an index of a transmission power ratio between an enhanced-dedicated physical data channel (E-DPDCH) and a dedicated physical control channel (DPCCH) is determined as an AG. An E-DPDCH is a high-efficiency dedicated physical data channel through which uplink user data (data for scheduled transmission) can be transmitted from a mobile station UE.

Here, each of the plurality of E-AGCHs #1 to #M may be a dedicated transmission rate control channel assigned separately to each of the mobile stations UE#1 to #N, or may be a common transmission rate control channel commonly assigned to mobile stations UE belonging to an arbitrary group.

Figure 4:
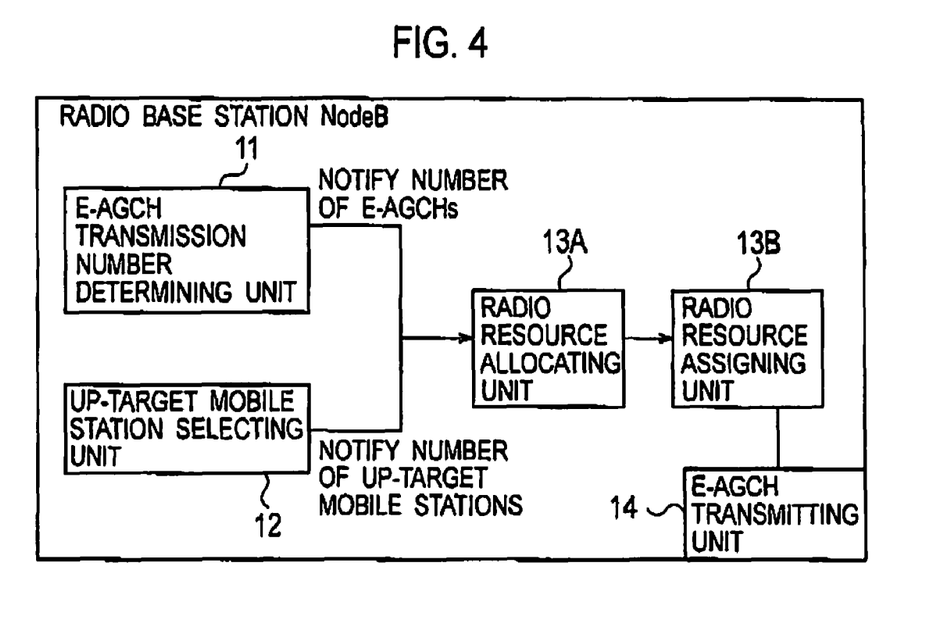
FIG. 4 is a functional block diagram of a radio base station according to the first embodiment of the present invention.

As shown in FIG. 4, the radio base station NodeB of the present embodiment includes an E-AGCH transmission number determining unit 11, an UP-target mobile station selecting unit 12, a radio resource allocating unit 13A, radio resource assigning unit 13B, and an E-AGCH transmitting unit 14.

The E-AGCH transmission number determining unit 11 is configured to determine the number of E-AGCHs to be transmitted in each of the cell.

For example, the E-AGCH transmission number determining unit 11 may be configured to determine the number of E-AGCHs that can be transmitted in each of the cell based on: the number of mobile stations UE performing communications in each of the cell, or the number of mobile stations UE located in each of the cell.

The UP-target mobile station selecting unit 12 is configured to select, at a predetermined timing (predetermined TTI or predetermined sub-frame), an "UP-target mobile station (increase-allowed mobile station)" whose uplink user data transmission rate can be increased, from among mobile stations UE performing communications in each of the cell.

For example, the UP-target mobile station selecting unit 12 determines, for every sub-frame (2 ms), whether each of the mobile stations UE performing the communications (that is, each of the mobile stations UE controlled by a scheduler) in each of the cell controlled by the radio base station NodeB is a mobile station whose uplink user data transmission rate can be decreased "DOWN-target mobile station"), or a mobile station whose uplink user data transmission rate can be increased ("UP-target mobile station (increase-allowed mobile station)").

The UP-target mobile station selecting unit 12 may be configured to select the "UP-target mobile station (increase-allowed mobile station)" based on: a priority class of each of the mobile station UE, or a communication status of each mobile station UE (such as the number of times of uplink user data retransmissions, a signal to interference ratio (SIR) in the uplink, an amount of data stored in a transmission buffer of each mobile station UE, a communication quality (CQI: channel quality information) in the downlink, and the like), for example.

When an available radio resource exists, the radio resource allocating unit 13A is configured to divide the available radio resource to the UP-target mobile stations at a predetermined timing.

For example, when each of the aforementioned E-AGCHs #1 to #M is used as a dedicated transmission rate control channel, the radio resource allocating unit 13A is configured to equally divide an available radio resource at a predetermined timing (predetermined TTI or predetermined sub-frame) based on the number of UP-target mobile stations.

Alternatively, the radio resource allocating unit 13A may be configured to equally divide the available radio resource at a predetermined timing (predetermined TTI or predetermined sub-frame) based on the number of E-AGCHs that can be transmitted in each of the cell. Here, the number of E-AGCHs that can be transmitted in each of the cell is determined by the E-AGCH transmission number determining unit 11.

Moreover, when the E-AGCH transmission number determining unit 11 determines that the number of E-AGCHs that can be transmitted in each of the cell is "M", and the UP-target mobile station selecting unit 12 selects "N" UP-target mobile stations, the radio resource allocating unit 13A may be configured to equally divide the available radio resource at a predetermined timing (predetermined TTI or predetermined sub-frame) based on the number of "M"s or "N"s, whichever smaller.

The radio resource assigning unit 13B is configured to select mobile stations to which the E-AGCH transmitting unit 14 can transmit the transmission rate control channel (E-AGCH). This selection is made from among the UP-target mobile stations (increase-allowed mobile stations) whose uplink user data transmission rates can be increased, except for the mobile station to which the E-AGCH transmitting unit 14 cannot transmit E-AGCHs for the reason such as predetermined timers are not completed, or the like. Hereinbelow, the mobile station to which the E-AGCH transmitting unit 14 can transmit the transmission rate control channel (E-AGCH) is referred to as "E-AGCH transmission targetable mobile station".

For example, when the number of UP-target mobile stations (increase-allowed mobile stations), which is notified by the UP-target mobile station selecting unit 12, is "B," and the number of E-AGCHs that can be transmitted, which is notified by the E-AGCH transmission number determining unit 11, is "3", the number of E-AGCH transmission targetable mobile stations is determined as "3."

Meanwhile, when the number of UP-target mobile stations (increase-allowed mobile stations), which is notified by the UP-target mobile station selecting unit 12, is "1," and the number of E-AGCHs that can be transmitted, which is notified by the E-AGCH transmission number determining unit 11, is "4", the number of E-AGCH transmission targetable mobile stations is determined as "1."

The radio resource assigning unit 13B is configured to assign, to each radio resources allocated to the mobile stations UE performing the communications at a predetermined timing (predetermined TTI or predetermined sub-frame), a radio resource (such as a radio band resource in the uplink, a hardware resource in the radio base station NodeB, and the like) for transmitting the uplink user data.

For example, when each of the aforementioned E-AGCHs #1 to #M is used as a dedicated transmission rate control channel, the radio resource assigning unit 13B is configured to add the radio resource equally divided by the radio resource allocating unit 13A, to each of the radio resources allocated to each of the E-AGCH transmission targetable mobile stations.

The E-AGCH transmitting unit 14 is configured to transmit the determined number of E-AGCHs #1 to #M in each of the cell. Here, the number of E-AGCHs that can be transmitted is determined by the E-AGCH transmission number determining unit 11.

In each of the cell, the E-AGCH transmitting unit 14 is also configured to notify, to the E-AGCH transmission targetable mobile stations, an AG (allowed value) corresponding to the radio resource to which the radio resource has been added by the radio resource assigning unit 13B, by using any one of the E-AGCHs #1 to #M.

Further, in each of the cell, the E-AGCH transmitting unit 14 is also configured to notify, to E-AGCH transmission targetable mobile stations among the DOWN-target mobile stations, an AG (allowed value) corresponding to the decreased radio resource, by using any one of the E-AGCHs #1 to #M.

Meanwhile, the mobile station UE of the present embodiment is configured to transmit the uplink user data at a transmission rate corresponding to an AG (allowed value) at a predetermined timing (predetermined TTI or predetermined sub-frame).

To be more specific, firstly, the mobile station UE updates an SG (scheduling grant) value indicating a transmission power ratio between an E-DPDCH and a DPCCH allowed for the mobile station UE, based on the AG (index of the transmission power ratio between the E-DPDCH and the DPCCH) or the RG (the relative value (UP/DOWN/HOLD) indicating the changes in the transmission power ratio between the E-DPDCH and the DPCCH). The AG or the RG is notified by the radio base station NodeB.

Secondly, the mobile station UE transmits the uplink user data at an uplink user data transmission rate (specifically, in a TBS (transport block size) of uplink user data) through the E-DPDCH. The transmission rate corresponds to the SG values on a one-to-one basis.

(Operation of the Mobile Communication System According to the First Embodiment of the Present Invention)

A description will be given of an operation of the mobile communication system (Specifically, the radio based station NodeB) according to the first embodiment of the present invention with reference to FIG. 5.

Figure 5:
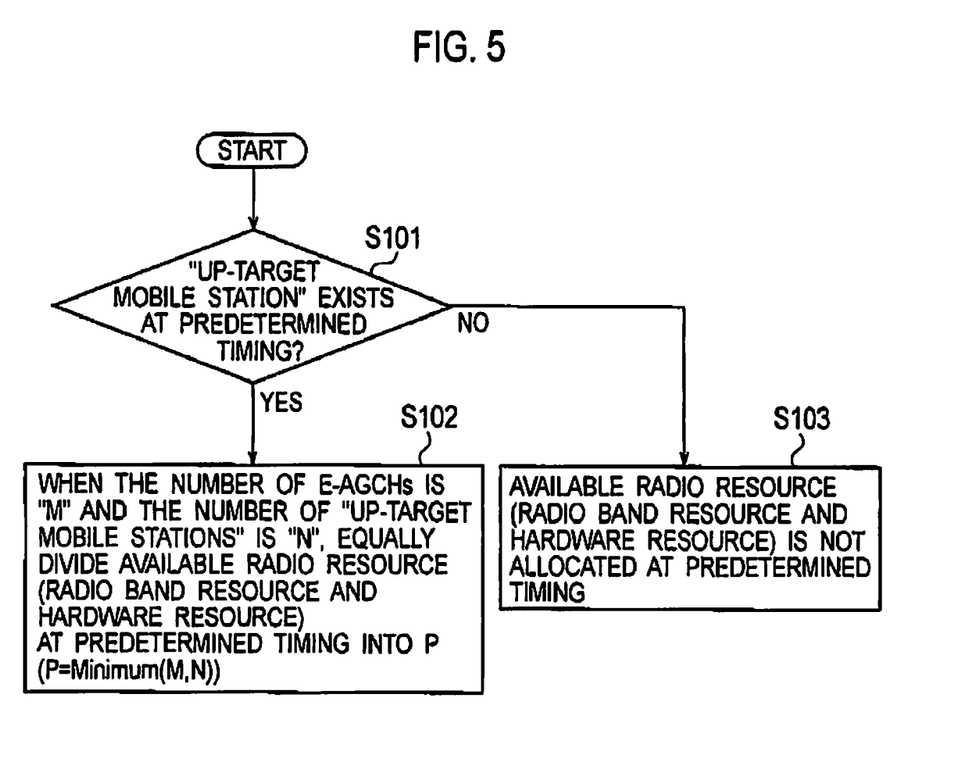
FIG. 5 is a flowchart illustrating an operation of the mobile communication system according to the first embodiment of the present invention.

As shown in FIG. 5, in step S101, the UP-target mobile station selecting unit 12a determines, at a predetermined timing (predetermined TTI or predetermined sub-frame), whether the UP-target mobile station exists. Here, 16 the UP-target mobile station indicates the mobile station whose transmission rate of the uplink user data (SG) can be increased.

When the UP-target mobile station exists, the operation proceeds to step S102. When the UP-target mobile station does not exist, the operation proceeds to step S103.

In step S102, at the predetermined timing, the radio resource allocating unit 13A equally divides the available resource based on the number of "M"s or "N"s, whichever smaller. Then, the radio resource assigning unit 13B assigns, as the additional radio resource, the radio resource equally divided by the radio resource allocating unit 13A, to a radio resource assigned to each of the E-AGCH transmission targetable mobile stations among the UP-target mobile stations.

Here, "M" indicates the number of E-AGCHs that can be transmitted in each of the cell, determined by the E-AGCH transmission number determining unit 11. Further, "N" indicates the number of UP-target mobile stations, selected by the UP-target mobile station selecting unit 12.

In step S103, allocation of the available radio resource to each of the mobile stations UE at the predetermined timing is not performed by the radio resource allocating unit 13A.

(Effect of the Mobile Communication System According to the First Embodiment of the Present Invention)

According to the mobile communication system of the present embodiment, when the radio base station NodeB separately transmits the plurality of E-AGCHs and controls the transmission rates of the uplink user data for each of the mobile stations UE in the same cell, equitable allocation of the radio resource for uplink user data transmission can be performed.

(Mobile Communication System According to a Second Embodiment of the Present Invention)

A description will be given of a mobile communication system according to a second embodiment of the present invention with reference to FIGS. 6 to 8. Hereinafter, the description will mainly be given of the differences of the mobile communication system between the first and second embodiments.

In the present embodiment, the radio resource allocating unit 13A is configured to allocate the available radio resource at a predetermined timing (predetermined TTI or predetermined sub-frame), based on the number of UP-target mobile stations (increase-allowed mobile stations) and a priority class of each of the UP-target mobile stations (increase-allowed mobile stations). The radio resource assigning unit 13B is configured to assign, as the additional radio resource, the radio resource divided by the radio resource allocating unit 13A, to a radio resource of each of the E-AGCH transmission targetable mobile stations.

Figure 6:
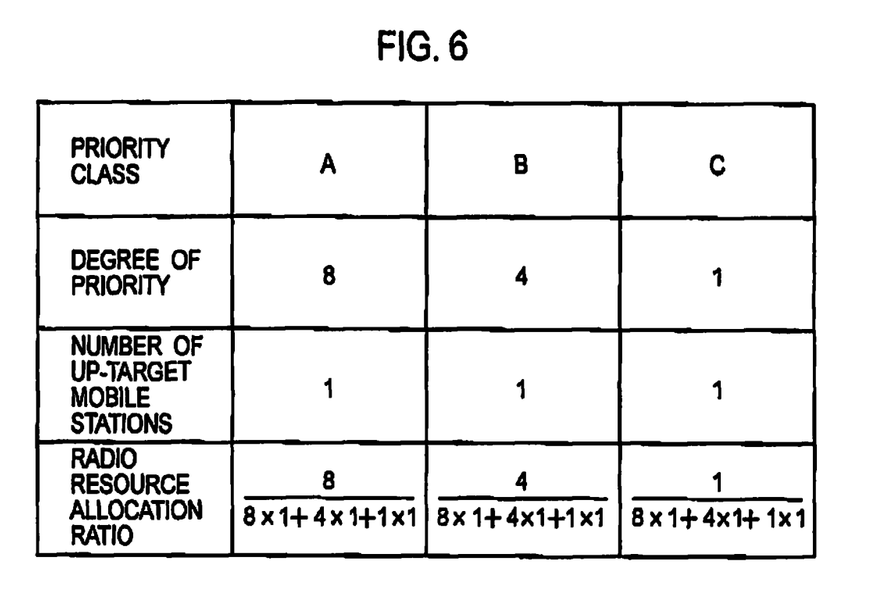
FIG. 6 is a diagram for describing a radio resource allocation method performed by a radio resource allocating unit of a radio base station according to a second embodiment of the present invention.

For example, as shown in FIG. 6, when the number of UP-target mobile stations A having a priority class A (degree of priority is 8) is "1", the number of "UP-target mobile stations B" having a priority class B (degree of priority is 4) is "1", and the number of UP-target mobile stations C having a priority class C (degree of priority is 1) is "1", the radio resource allocating unit 13A determines a radio resource allocation ratio for each of the UP-target mobile station A as "8/13", the radio resource allocation ratio for each of the UP-target mobile station B as "4/13", and the radio resource allocation ratio for each of the UP-target mobile station C as "1/13".

Meanwhile, as shown in FIG. 7, when the number of UP-target mobile stations A having the priority class A (degree of priority is 8) is "2", the number of UP-target mobile stations B having the priority class B (degree of priority is 4) is "0", and the number of UP-target mobile stations C having the priority class C (degree of priority is 1) is "1", the radio resource allocating unit 13A determines the radio resource allocation ratio for each of the UP-target mobile station A as "8/17", and the radio resource allocation ratio for each of the UP-target mobile station C as "1/17".

The radio resource allocating unit 13A may otherwise be configured to divide the available radio resource at a predetermined timing, based on the number of transmission rate control channels (E-AGCHs) that can be transmitted in each cell, and the priority class (ratio between the degrees of priorities) of each of the "UP-target mobile stations (increase-allowed mobile stations)." The radio resource assigning unit 13B may be configured to assign the radio resource divided by the radio resource allocating unit 13A, to each radio resources allocated to each of the E-AGCH transmission targetable mobile stations.

Moreover, the radio resource allocating unit 13A may otherwise be configured to divide the available radio resource at a predetermined timing, based on the number of transmission rate control channels (E-AGCHs) that can be transmitted in each call or the number of UP-target mobile stations (increase-allowed mobile stations), whichever smaller, and based on the priority class (ratio between the degrees of priorities) of each of the UP-target mobile stations (increase-allowed mobile stations). The radio resource assigning unit 13B may be configured to assign, as the additional radio resource, the radio resource divided by the radio resource allocating unit 13A, to each of the radio resource allocated to the E-AGCH transmission targetable mobile stations.

A description will be given of an operation of the mobile communication system (specifically, the radio based station NodeB) according to the second embodiment of the present invention with reference to FIG. 8.

Figure 8:
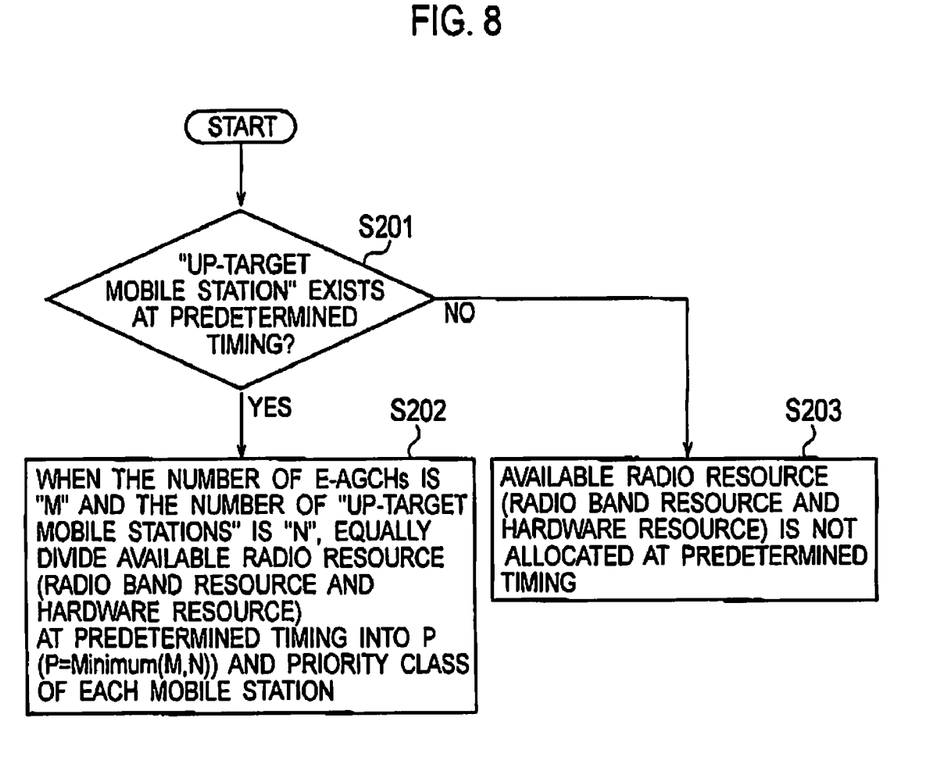
FIG. 8 is a flowchart illustrating an operation of a mobile communication system according to the second embodiment of the present invention.

As shown in FIG. 8, in step S201, the UP-target mobile station selecting unit 12a determines, at the predetermined timing, whether the UP-target mobile station exists. Here, the UP-target mobile station indicates the mobile station whose transmission rate of the uplink user data (SG) can be increased.

When the UP-target mobile station exists, the operation proceeds to step S202. When the UP-target mobile station does not exist, the operation proceeds to step S203.

In step S202, at the predetermined timing, the radio resource allocating unit 13A allocates the available resource, based on a priority class (ratio between the degrees of priorities) of each of the UP-target mobile stations, and based on the number of "M"s or "N"s, whichever smaller. Then, the radio resource assigning unit 138 assigns the radio resource divided by the radio resource allocating unit 13A, to the radio resource allocated to each of the E-AGCH transmission targetable mobile stations.

Here, "M" indicates the number of E-AGCHs that can be transmitted in each of the cell, determined by the E-AGCH transmission number determining unit 11. Further, "N" indicates the number of UP-target mobile stations, selected by the UP-target mobile station selecting unit 12.

In step S203, allocation of the available radio resource to each of the mobile stations UE at the predetermined timing is not performed by the radio resource allocating unit 13A.

According to the mobile communication system of the present embodiment, when the radio base station NodeB separately transmits the plurality of E-AGCHs and controls the transmission rates of the uplink user data for each of the mobile stations UE in the same cell, the radio resource for uplink user data transmission can be divided based on the priority classes (degrees of priority) of the mobile stations.

Note that the operations of the above-mentioned mobile station UE and the radio base station NodeB may be implemented by a hardware, by a software module executed by a processor, or by a combination of the two.

The software module may be provided in a storage medium of any form such as a Random Access Memory (RAM), a flash memory, a Read Only Memory (ROM), an Erasable Programmable ROM (EPROM), an Electronically Erasable and Programmable ROM (EEPROM), a register, a hard disk, a removable disk, and a CD-ROM.

The storage medium is connected to a processor so that the processor can read and write information from and to the storage medium. The storage medium may otherwise be integrated in a processor. The storage medium and the processor may be provided within an ASIC, and the ASIC may be provided in the mobile station UE and the radio base station NodeB. Otherwise, the storage medium and the processor may be provided in each of the mobile station UE and the radio base station NodeB as discrete components.

Hereinabove, the present invention has been described in detail by use of the embodiment. However, it is obvious to those skilled in the art that the present invention is not limited to the embodiment described herein. The present invention may be implemented as a modification and a variation, within the spirit and scope of the present invention defined by the scope of claims. Accordingly, the present specification aims to provide an exemplar description and does not limit the present invention in any way.

What is claimed is:

1. A transmission rate control method in which a radio base station controls a transmission rate of uplink user data transmitted from a mobile station, comprising:
    selecting, at the radio base station, from among mobile stations performing communications in a cell, increase-allowed mobile stations whose uplink user data transmission rate can be increased at a predetermined timing;
    equally dividing, at the radio base station, an available radio resource at the predetermined timing, based on the number of increase-allowed mobile stations or the number of transmission rate control channels that can be transmitted in the cell;
    adding, at the radio base station, the radio resource equally divided by the radio base station, to each radio resources allocated to each mobile stations to which a transmission rate control channel can be transmitted and is one of the increase-allowed mobile stations;
    notifying, from the radio base station to each mobile stations to which the transmission rate control channel can be transmitted and is one of the increase-allowed mobile stations, an allowed value corresponding to a radio resource to which the radio resource equally divided by the radio base station has been added; and
    transmitting, from each mobile stations to which the transmission rate control channel can be transmitted and is one of the increase-allowed mobile stations, the uplink user data at a transmission rate corresponding to the allowed value.

2. The transmission rate control method according to claim 1, wherein in the equally dividing, the radio base station divides the available radio resource at the predetermined timing based on the number of transmission rate control channels that can be transmitted in the cell or the number of increase-allowed mobile stations, whichever smaller.

3. A transmission rate control method in which a radio base station controls a transmission rate of uplink user data transmitted from a mobile station, comprising:
    selecting, at the radio base station, from among mobile stations performing communications in a cell, increase-allowed mobile stations whose uplink user data transmission rate can be increased at a predetermined timing;
    allocating, at the radio base station, an available radio resource at the predetermined timing, based on a priority class of each of the increase-allowed mobile stations, and based on the number of increase-allowed mobile stations or the number of transmission rate control channels that can be transmitted in the cell;
    adding, at the radio base station, the radio resource allocated by the radio base station, to each radio resources allocated to each mobile stations to which a transmission rate control channel can be transmitted and is one of the increase-allowed mobile stations;
    notifying, from the radio base station to each mobile stations to which the transmission rate control channel can be transmitted and is one of the increase-allowed mobile stations, an allowed value corresponding to a radio resource to which the radio resource allocated by the radio base station has been added; and
    transmitting, from each mobile stations to which the transmission rate control channel can be transmitted and is one of the increase-allowed mobile stations, the uplink user data at a transmission rate corresponding to the allowed value, wherein
    in allocating the available radio resource, the radio base station allocates the available radio resource at the predetermined timing, based on the number of transmission rate control channels that can be transmitted in the cell or the number of increase-allowed mobile stations, whichever smaller, and based on the priority class of each of the increase-allowed mobile stations.

4. A mobile communication system in which a radio base station is configured to control a transmission rate of uplink user data transmitted from a mobile station, wherein
    the radio base station is configured to select, from among mobile stations performing communications in a cell, increase-allowed mobile stations whose uplink user data transmission rate can be increased at a predetermined timing;
    the radio base station is configured to equally divide an available radio resource at the predetermined timing, based on the number of increase-allowed mobile stations or the number of transmission rate control channels that can be transmitted in the cell;
    the radio base station is configured to add the radio resource equally divided by the radio base station, to each radio resources allocated to each mobile stations to which a transmission rate control channel can be transmitted and is one of the increase-allowed mobile stations;
    the radio base station is configured to notify, to each mobile stations to which the transmission rate control channel can be transmitted and is one of the increase-allowed mobile stations, an allowed value corresponding to a radio resource to which the radio resource equally divided by the radio base station has been added; and
    each mobile stations to which the transmission rate control channel can be transmitted and is one of the increase-allowed mobile stations is configured to transmit the uplink user data at a transmission rate corresponding to the allowed value.

5. The mobile communication system according to claim 4, wherein the radio base station is configured to equally divide the available radio resource at the predetermined timing based on the number of transmission rate control channels that can be transmitted in the cell or the number of increase-allowed mobile stations, whichever smaller.

6. A mobile communication system in which a radio base station is configured to control a transmission rate of uplink user data transmitted from a mobile station, wherein
    the radio base station is configured to select, from among mobile stations performing communications in a cell, increase-allowed mobile stations whose uplink user data transmission rate can be increased at a predetermined timing;
    the radio base station is configured to allocate an available radio resource at the predetermined timing, based on a priority class of each of the increase-allowed mobile stations, and based on the number of increase-allowed mobile stations or the number of transmission rate control channels that can be transmitted in the cell;
    the radio base station is configured to notify, to each mobile stations to which the transmission rate control channel can be transmitted and is one of the increase-allowed mobile stations, an allowed value corresponding to a radio resource to which the radio resource allocated by the radio base station has been added; and each mobile stations to which the transmission rate control channel can be transmitted and is one of the increase-allowed mobile stations is configured to transmit the uplink user data at a transmission rate corresponding to the allowed value; and the radio base station is further configured to allocate the available radio resource at the predetermined timing, based on the number of transmission rate control channels that can be transmitted in the cell or the number of increase-allowed mobile stations, whichever smaller, and based on the priority class of each of the increase-allowed mobile stations.

7. A radio base station configured to notify an allowed value by use of a transmission rate control channel and to control a transmission rate of uplink user data transmitted from a mobile station, comprising:

a selecting unit configured to select, from among mobile stations performing communications in a cell, increase-allowed mobile stations whose uplink user data transmission rate can be increased at a predetermined timing;

a radio resource allocating unit configured to equally divide an available radio resource at the predetermined timing, based on the number of increase-allowed mobile stations or the number of transmission rate control channels that can be transmitted in the cell;

a radio resource assigning unit configured to add the radio resource equally divided by the radio base station, to each radio resources allocated to each mobile stations to which a transmission rate control channel can be transmitted and is one of the increase-allowed mobile stations; and a transmission rate control channel transmitting unit configured to notify, to each mobile stations to which the transmission rate control channel can be transmitted and being one of the increase-allowed mobile stations, an allowed value corresponding to a radio resource to which the radio resource equally divided by the radio base station has been added.

8. The radio base station according to claim 7, wherein the radio resource allocating unit is configured to equally divide the available radio resource at the predetermined timing based on the number of transmission rate control channels that can be transmitted in the cell or the number of increase-allowed mobile stations, whichever smaller.

9. A radio base station configured to notify an allowed value by use of a transmission rate control channel and to control a transmission rate of uplink user data transmitted from a mobile station, comprising:

a selecting unit configured to select, from among mobile stations performing communications in a cell, increase-allowed mobile stations whose uplink user data transmission rate can be increased at a predetermined timing;

a radio resource allocating unit configured to allocate an available radio resource at the predetermined timing, based on a priority class of each of the increase-allowed mobile stations, and based on the number of increase-allowed mobile stations or the number of transmission rate control channels that can be transmitted in the cell;

a radio resource assigning unit configured to add the radio resource allocated by the radio base station, to each radio resources allocated to each mobile stations to which a transmission rate control channel can be transmitted and is one of the increase-allowed mobile stations; and a transmission rate control channel transmitting unit configured to notify, to each mobile stations to which the transmission rate control channel can be transmitted and being one of the increase-allowed mobile stations, an allowed value corresponding to a radio resource to which the radio resource allocated by the radio base station has been added; and the radio resource allocating unit is further configured to allocate the available radio resource at the predetermined timing, based on the number of transmission rate control channels that can be transmitted in the cell or the number of increase-allowed mobile stations, whichever smaller, and based on the priority class of each of the increase-allowed mobile stations.

* * * * *